INVENTORS
James E. Hencken
Walter H. Merker
BY Edward H. Goodrich
THEIR ATTORNEY

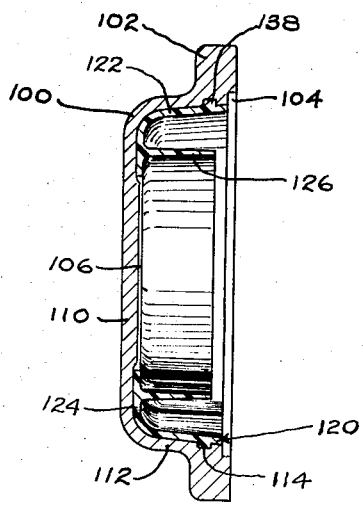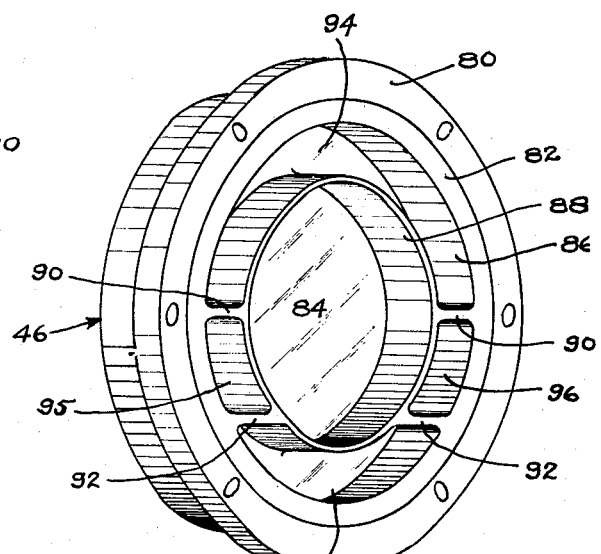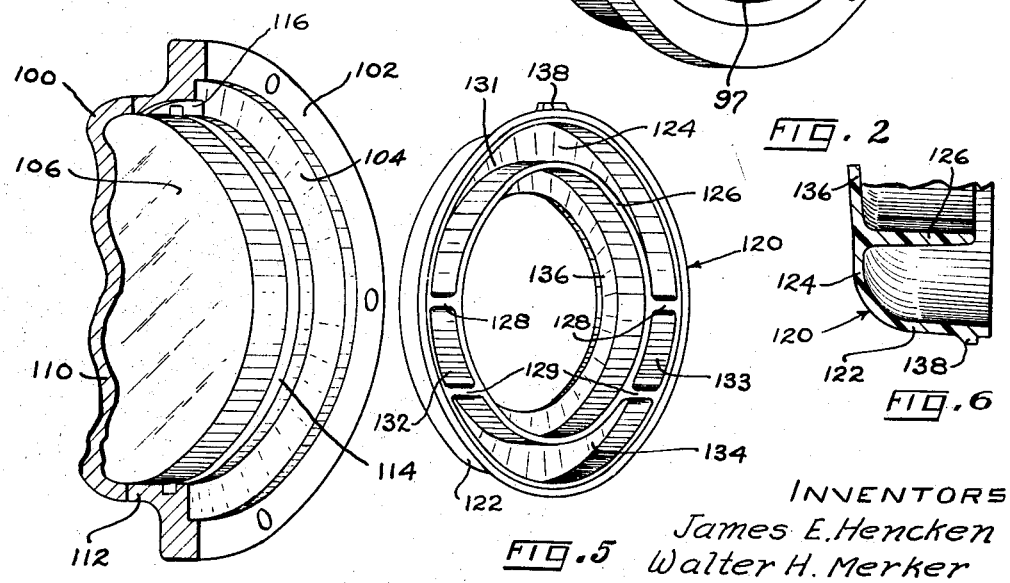

United States Patent Office 2,919,962
Patented Jan. 5, 1960

2,919,962
SHAFT SUPPORT AND LUBRICATING ARRANGEMENT

James E. Hencken, Villa Park, and Walter H. Merker, Downers Grove, Ill., assignors to General Motors Corporation, Detroit, Mich., a corporation of Delaware Application April 23, 1957, Serial No. 654,489

7 Claims. (Cl. 308—187)

This invention relates to antifrictional shaft supports and particularly to an improved lubricating arrangement for an antifriction bearing which rotatably supports a shaft.

In traction motors, railroad journal boxes and in other generally similar constructions involving heavy rotating shafts, it is usually desirable to provide for a small amount of endwise shaft movement during its rotation. It is also common practice to antifrictionally support such a shaft on roller bearings having cylindrical rollers arranged to roll against cylindrical raceways. A controlled amount of endwise movement between the rollers and both of these raceways has provided a convenient construction which allows this endwise shaft movement during its rotation. Usually, these roller bearings are mounted at the end of a shaft which projects into an end cover that also closes the end of the bearing and contains a supply of lubricant, as grease, for the bearing. The inner end of the bearing of such a construction is closed against lubricant leakage by overlying members providing a suitable seal.

The endwise movement of such a shaft within the end cover, which is frequently abrupt under some conditions of operation, causes the end of the shaft within the cover to act as the piston of a pump which detrimentally forces the lubricant into and out of the bearing and also causes excessive mechanical working and heating of the lubricant with accompanying oxidation and softening of the grease. This pumping action then forces the softened lubricant past the bearing closure and into motor windings or to other locations where it may cause damage. This condition of objectionable lubricant pumping from a bearing due to endwise shaft movement has existed for many years and has been one of the principal causes for the failure of antifriction bearings in such location. Additionally, the grease supply packed within the end cover which receives the rotating end of the shaft, tends to slump to the bottom of the grease chamber due to road shocks. This grease then works through and out of the bearing so that frequent inspection and relubrication of the bearing is necessary to prevent the bearing from sudden failure which usually occurs when it is operated in an insufficiently lubricated condition.

It is, therefore, an object of this invention to provide an improved lubricating arrangement for an antifriction bearing wherein lubricant from an auxiliary supply is supplied to the bearing as needed.

It is a further object of this invention to provide an improved end closure for a bearing which supplies lubricant to the bearing and which prevents this lubricant from normally settling to the bottom of the lubricant chamber.

It is a still further object of this invention to provide an improved lubricant-supplying end closure which receives the end of a rotatable and axially movable shaft and avoids objectionable pumping of lubricant from the closure under influence of the endwise shaft movement.

To these ends and also to improve generally upon devices of this character, this invention consists in the various matters hereinafter described and claimed. In its broader aspects, the invention is not necessarily limited to the specific structures selected for illustrative purposes in the accompanying drawings wherein:

Figure 2 is a perspective view showing the end cover with its baffling arrangement.

Figure 3 is a cross sectional view showing another embodiment of the end cover.

Figure 4 is a fragmentary perspective view of the cover structure of Figure 3.

Figure 5 is a perspective view of the annular insert adapted to be received within the end cover of Figure 4 and Figure 6 is an enlarged fragmentary cross sectional detail of the insert shown in Figure 5.

Figure 1:
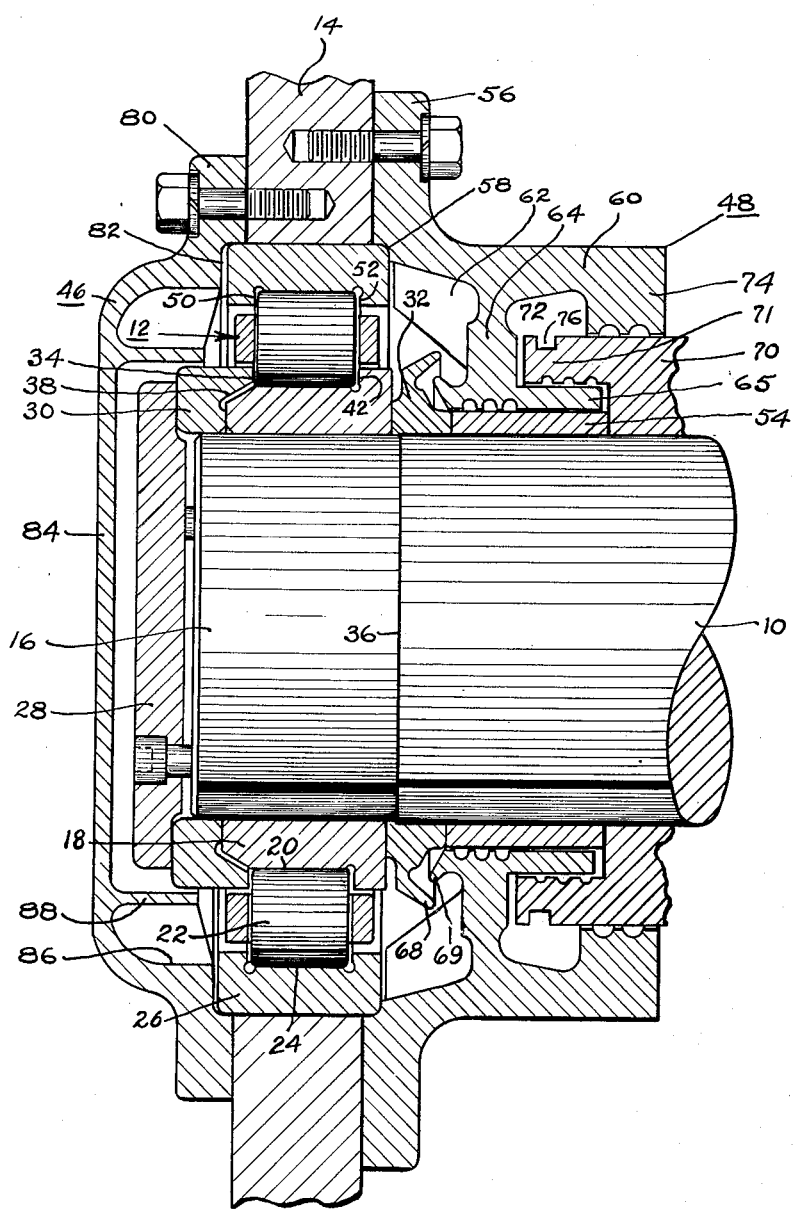
Figure 1 is an enlarged cross-sectional view of a shaft mounting showing our improved end cover construction.

As illustrated, a shaft 10 is rotatably supported at one end by an antifriction bearing, as a roller bearing 12, within a housing 14. A reduced end 16 of this shaft is secured, as by a press fit, within the bore of an inner bearing ring 18 having a cylindrical raceway 20 rotatably supported by a series of circumferentially spaced cylindrical rollers 22 that also roll against the cylindrical raceway 24 of an outer race ring 26 mounted within a bore through the housing 14. A circular plate 28, secured by screws threaded into the shaft end, clamps against a cylindrical thrust collar 30 slidably fitted over the shaft end to firmly clamp the inner race ring 18 between this collar and an annular slinger 32 which is fitted over the shaft against a shaft shoulder 36. An annular frustoconical portion 38 of the thrust collar overlies a conical tapering end of the race ring 18 in spaced relation and terminates in a roller engageable thrust shoulder 34. The inner end of the raceway 20 terminates in a race ring thrust shoulder 42. The spacing between the shoulders 34 and 42 preferably exceeds the length of the rollers to provide for controlled endwise movement of the shaft 10.

The outer race ring 26 is demountably positioned within the bore of the housing 14 between a front end cover 46 and a rear end cap 48 through which the shaft 10 projects. The outer race ring 26 is also provided with annular roller engageable shoulders 50 and 52 axially spaced apart through a distance slightly exceeding the roller length to provide for the required endwise shaft movement in conjunction with the spaced roller engaging shoulders at the ends of the inner race ring. A sleeve 54, fitted over and rotatable with the shaft 10 abuts against the end of the annular slinger member 32. The rear end cap 48 has a flat face on an annular flanged portion 56 demountably clamped against the rearward flat face of the housing 14 as by suitable screws or bolts. A counterbore 58 receives the rearward end of the race ring 26. A rearwardly projecting boss 60 of the end cap 48 has an annular chamber 62 surrounding the shaft and opening into the rearward end of the bearing. An intermediate generally radially disposed wall 64 of the boss 60 forms the rearward end of the chamber 62 and extends into closely surrounding spaced relation with the sleeve 54. A sleeve 65 on the boss 60 is integral at its forward end with the wall 64 and axially extends rearwardly therefrom in closely spaced surrounding relation to the sleeve 54, the bore of the sleeve 65 preferably being coextensive with the bore through the wall 64 which receives the sleeve 54. An annular slinger flange 68 angularly projects outwardly and rearwardly in spaced overlying relation to an annular lip 69 on the inner end of the wall 64 to throw lubricant back into the chamber 62 so that it will not tend to leak out between the sleeves 54 and 65. A sleeve 70 secured to the shaft 10 abuts the rearward end of the sleeve 54 and has an annular portion 71 closely overlying the sleeve 65 in radially spaced relation. This annular portion extends into an annular pocket 72 between the wall 64 and a radially disposed rear wall 74 of the boss 60, this rear wall closely surrounding the cylindrical periphery of the sleeve 70. A slinger groove 76 is formed in the forward end of the annular portion 71 and opens radially outwardly into the pocket 72. The members 64, 71 and 74 are provided with the usual lubricant and dirt-restraining grooves in surrounding relation to adjacent cylindrical surfaces. With this arrangement, the close spacing between the sleeves 54 and 70 and the adjacent walls of the boss 60 provide a labyrinth type of seal which resists lubricant leakage and which also prevents the entrance of dirt, water and other deleterious materials into the bearing.

The front end cover 46, which receives the end of the shaft 10 and the plate 28, as well as a portion of the thrust collar 30, has an annular flange 80 provided with a flat face clamped in sealing engagement with the flat front wall of the housing 14 as by suitable screws or bolts. This flange 80 is counterbored at 82 to receive the projecting forward end of the outer race ring 26 and the bottom of this counterbore provides a locating shoulder which cooperates with the bottom wall of the counterbore 58 to locate the outer race ring within the housing 14. The end cap 46 is somewhat cup-shaped in form and has a front wall 84 spaced from the plate 28 and blending into the flange 80 to provide a circular inner wall 86. A cylindrical wall 88, coaxial with the shaft 10, extends outwardly from the front wall 84 into closely radially spaced surrounding relation with the cylindrical periphery of the thrust collar 30. This provides an annular grease-receiving space between the walls 86 and 88 which is divided by a series of baffles 90 and 92, the baffles 90 being preferably horizontally disposed on a diameter and the baffles 92 being preferably chordally disposed a short distance therebeneath. With this arrangement, lubricant such as a suitable grease may be placed within the arcuate pockets 94, 95, 96 and 97 formed between these baffles and the walls 88 and 86 to provide an ample supply of lubricant for the bearing 12. These baffles prevent the objectionable settling of the grease and of fluid lubricant into the bottom of the end cover and provide for circumferentially spaced pockets from which grease may be gradually supplied to the bearing as needed over a very long period. The close running clearance between the inner surface of the cylindrical wall 88 and the cylindrical periphery of the collar 30 prevents the objectionable pocketing of grease between the front cover wall 84 and the plate 28. Consequently, the endwise shifting of the shaft 10 will not enter into a pocket of grease and pump grease out through the bearing. Hence, all of the grease in the pockets 94, 95, 96 and 97 may effectively serve to keep the bearing lubricated for a very much longer trouble-free period than has been possible heretofore.

In the embodiment illustrated in Figures 3 through 6, our end cover 100 has a cup-shaped form similar to that of the cover 46 and is provided with a peripheral mounting flange 102 corresponding to the flange 80. The forward end of the outer race ring 26 is received within a counterbore 104 in a similar manner to that described with respect to the counterbore 82. The cover 100 has a cup-shaped and preferably circular pocket 106 formed by a flat front wall 110 which blends into an annular wall 112 that opens into the counterbore 104. An annular groove 114 is cut into the flange portion of the wall 112 and radially opens into the pocket 106. A locating groove 116 in this flanged portion extends axially from the counterbore 104 and cuts across the groove 114 as best shown in Figure 4.

An annular insert member 120, which may be molded from plastic or otherwise suitably formed from slightly resilient material, is demountably fastened within the circular pocket 106 to provide a baffle arrangement serving in the same manner as the baffles in the end cover 46. The member 120 has a peripheral wall 122 which is contoured to matingly fit against the internal surface of the annular wall 112 and which integrally merges with an annular end wall 124 arranged to seat against the inner face of the front cover wall 110. A cylindrical wall 126, coaxial with and radially spaced from the peripheral wall 122, is secured to and axially extends forwardly from the end wall 124 for closely spaced surrounding relation with the collar 30 in the same manner as provided by the cylindrical wall 88 in Figure 1. The annular space between the walls 122 and 126 is interrupted by a pair of horizontally disposed baffles 128 and by a pair of chordally disposed baffles 129 therebeneath to provide arcuate lubricant chambers 131, 132, 133 and 134 which prevent the settling of a grease lubricant as previously explained. The end wall 124 is preferably annular in form and has a slightly angularly disposed lip 136 projecting radially inwardly from the cylindrical wall 126 for resiliently yieldable bottoming engagement against the cover wall 110. A series of circumferentially spaced radially projecting lugs 138 on the peripheral wall 122 snap into and out of the groove 114 to demountably fasten the insert member 120 in bottoming engagement within the end cover 100. One of these lugs may also have a portion extending beyond the groove 114 into interfitting relation with the groove 116 to angularly locate the insert and maintain the baffles 128 and 129 in their substantially horizontal position when the end cover is in assembled position against the housing. If desired, the lugs 138 may be replaced by a continuously extending annular bead radially projecting from the wall 122. Due to the inherently resilient characteristic of the insert member 120, the wall 122 may be deformed sufficiently to enter this bead into fitting relation within the annular groove 114.

We claim:

1. A supporting and lubricating mechanism comprising an antifriction bearing, a shaft extending through the bearing and supported thereby for rotatable and endwise movements, a generally cup-shaped cover receiving an end of the shaft and closing an end of the bearing, a peripheral cover wall adjacent the bearing, a cylindrical cover wall radially spaced from said peripheral wall and overlying an end of the shaft, the annular space between said cover walls providing a lubricant supply chamber opening into the adjacent end of said bearing, and a plurality of baffles extending between said cover walls to prevent settling of the lubricant in the supply chamber to the bottom of said chamber.

2. A supporting and lubricating mechanism comprising an antifriction bearing, a shaft extending through the bearing and supported thereby for rotatable and endwise movements, a generally cup-shaped cover enclosing an end of the shaft and an end of said bearing, the cover having a plurality of arcuate lubricant-containing chambers opening into the bearing, and baffle walls in the cover separating the lubricant chambers to prevent settling of lubricant to the bottom of said cover.

3. A supporting and lubricating mechanism comprising an antifriction bearing, a shaft extending through and supported near its end by said bearing for rotatable and endwise movements, a cover receiving an end of the shaft and enclosing an end of the bearing, an annular insert mounted in the cover, an annular peripheral insert wall, a cylindrical inner wall on the insert in radially spaced coaxial relation to said peripheral wall, an end insert wall connected to the peripheral wall and to said inner wall, the annular space between said walls axially opening into an end of the bearing, and said inner wall enclosing the end of the shaft and preventing the pocketing of lubricant between the shaft end and the cover.

4. A supporting and lubricating mechanism comprising and antifriction bearing, a shaft extending through and supported near its end by said bearing for rotatable and endwise movements, a cup-shaped cover receiving an end of the shaft and closing an end of the bearing, an annular insert mounted in the cover, the insert and cover having interlocking portions to secure the insert in position, a peripheral insert wall seated against the cover, an annular insert wall radially spaced from the peripheral wall and surrounding the shaft in spaced relation, the space between said walls providing lubricant chambers opening into the bearing, and baffle members extending between said walls to prevent the settling of lubricant into the bottom of said insert.

5. A supporting and lubricating mechanism comprising a housing, an antifriction bearing supported by the housing, a shaft extending through the bearing and supported thereby for rotatable and endwise movements, a generally cup-shaped cover secured to the housing and enclosing an end of the shaft and an end of said bearing, a cylindrical collar on the shaft adjacent said bearing, an annular insert mounted in the cover and having an inner and an outer coaxial wall in radially spaced relation and a connecting annular end wall, the inner wall being in closely spaced surrounding relation to said collar to prevent lubricant leakage into the space between the cover and the shaft end, and the annular space between said insert walls providing a lubricant supply chamber opening into the bearing.

6. A supporting and lubricating mechanism comprising a housing, an antifriction bearing supported by the housing, a shaft extending through the bearing and supported thereby for rotatable and endwise movements, a cup-shaped cover secured to the housing and enclosing an end of the shaft and an end of said bearing, an annular insert within the cover and having a peripheral wall and a bottom wall seated against the cover, an annular insert wall projecting from said bottom wall in radially spaced relation to the peripheral wall and in surrounding spaced relation to said shaft end, the bottom wall radially projecting inwardly beyond said annular wall, baffles horizontally extending between the insert walls, and lugs projecting from said peripheral wall into interfitting relation with the cover to secure the insert in the cover.

7. A supporting and lubricating mechanism comprising an antifriction bearing, a shaft extending through and supported by the bearing for rotatable and endwise movements, a generally cup-shaped cover receiving an end of the shaft and closing an end of said bearing, a front end wall forming an integral part of said cover and spaced from the end of the shaft, a cylindrical collar carried by the forward end of the shaft and abutting the bearing, an intermediate annular cover wall extending axially inwardly from the front end wall and closely surrounding the cylindrical collar to prevent pocketing of lubricant between the shaft and said cover, and the cover having a plurality of circumferentially spaced arcuate lubricant chambers cooperatively surrounding said annular wall and opening into said bearing.

References Cited in the file of this patent
UNITED STATES PATENTS

| | | |
|---|---|---|
| 1,872,251 | Cowin | Aug. 16, 1932 |
| 2,018,221 | Mueller | Oct. 22, 1935 |
| 2,605,148 | Shoup | July 29, 1952 |